(12) United States Patent
Christiansen et al.

(10) Patent No.: US 8,078,639 B2
(45) Date of Patent: Dec. 13, 2011

(54) FILE SYSTEM FILTERS AND TRANSACTIONS

(75) Inventors: Neal R. Christiansen, Bellevue, WA (US); Ravinder S. Thind, Kirkland, WA (US); Ravisankar V. Pudipeddi, Bellevue, WA (US); Dana D. Groff, Sammamish, WA (US); Jonathan M. Cargille, Seattle, WA (US); Brian K. Dewey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/884,974

(22) Filed: Sep. 17, 2010

(65) Prior Publication Data

US 2011/0113021 A1    May 12, 2011

Related U.S. Application Data

(63) Continuation of application No. 11/282,879, filed on Nov. 18, 2005, now abandoned.

(51) Int. Cl.
 *G06F 17/30* (2006.01)
(52) U.S. Cl. ......... 707/791; 707/802; 707/822; 707/828
(58) Field of Classification Search ........... 707/600–831
 See application file for complete search history.

(56) References Cited

U.S. PATENT DOCUMENTS

| | | | |
|---|---|---|---|
| 5,274,819 A | 12/1993 | Blomfield-Brown | |
| 5,553,285 A | 9/1996 | Krakauer | |
| 6,026,402 A | 2/2000 | Vossen | |
| 6,353,834 B1 | 3/2002 | Wong | |
| 6,446,088 B1 | 9/2002 | Vaduvur | |
| 6,584,466 B1 | 6/2003 | Serbinis | |
| 6,625,601 B1 | 9/2003 | Molloy | |
| 6,856,993 B1 | 2/2005 | Verma | |
| 6,971,019 B1 | 11/2005 | Nachenberg | |
| 6,993,603 B2 | 1/2006 | Pudipeddi | |
| 7,636,946 B2 * | 12/2009 | Verma et al. ................. | 726/24 |
| 2002/0138489 A1 | 9/2002 | Trivedi | |
| 2002/0174102 A1 | 11/2002 | Kyler | |
| 2003/0041097 A1 | 2/2003 | Tormasov | |
| 2004/0193895 A1 | 9/2004 | Kaneko | |
| 2005/0021529 A1 | 1/2005 | Hodson | |
| 2005/0149525 A1 | 7/2005 | Verma | |

(Continued)

FOREIGN PATENT DOCUMENTS

EP     0336548     10/1989

(Continued)

OTHER PUBLICATIONS

Building and Extensible Operating System http://www.dogfish.org/chris/papers/thesis.pdf.

(Continued)

*Primary Examiner* — Isaac M Woo
(74) *Attorney, Agent, or Firm* — Workman Nydegger

(57) ABSTRACT

Aspects of the subject matter described herein relate to file system filters and transactions. In aspects, a filter may enlist to receive notification of events associated with a transaction. Afterwards, the filter may receive notification of a transaction event for which it has enlisted. In response to receiving notification of the transaction the filter may perform an action as appropriate. Aspects of the subject matter described herein may be applied to stacked and managed filters.

13 Claims, 11 Drawing Sheets

U.S. PATENT DOCUMENTS

2005/0203903 A1    9/2005    Rajan
2006/0026675 A1    2/2006    Cai

OTHER PUBLICATIONS

Kernel Enhancements for Microsoft Windows Vista and Windows Server Longhorn http://download.microsoft.com/download/9/c/5/9c5b2167-8017-4bae-9fde-d599bac818a/kernel-en.doc.

MohaveFS: A Transactional Distributed File System, 2003 http://mojave.caltech.edu/papers/submitted/idscs03.pdf.
U.S. Appl. No. 11/282,879, Mail Date Nov. 26, 2007, Office Action.
U.S. Appl. No. 11/282,879, Mail Date Jul. 7, 2008, Office Action.
U.S. Appl. No. 11/282,879, Mail Date Dec. 29, 2008, Office Action.
U.S. Appl. No. 11/282,879, Mail Date Jun. 23, 2009, Office Action.
U.S. Appl. No. 11/282,879, Mail Date Oct. 27, 2009, Office Action.
U.S. Appl. No. 11/282,879, Mail Date Mar. 17, 2010, Office Action.

* cited by examiner

FILE SYSTEM FILTERS AND TRANSACTIONS

CROSS-REFERENCE TO RELATED APPLICATIONS

This application is a continuation of co-pending U.S. patent application Ser. No. 11/282,879, filed on Nov. 18, 2005, titled File System Filters and Transactions.

BACKGROUND

With contemporary operating systems, such as Microsoft Corporation's Windows® XP operating system with an underlying file system such as the Windows® NTFS (Windows® NT File System), FAT, CDFS, SMB redirector file system, or WebDav file systems, one or more file system filter drivers may be inserted between the I/O manager that receives user I/O requests and the file system driver. In general, filter drivers (sometimes referred to herein simply as "filters") are processes or components that enhance the underlying file system by performing various file-related computing tasks that users desire, including tasks such as passing file system I/O (requests and data) through anti-virus software, file system quota providers, file replicators, and encryption/compression products.

For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

SUMMARY

Briefly, aspects of the subject matter described herein relate to file system filters and transactions. In aspects, a filter may enlist to receive notification of events associated with a transaction. Afterwards, the filter may receive notification of a transaction event for which it has enlisted. In response to receiving notification of the transaction the filter may perform an action as appropriate. Aspects of the subject matter described herein may be applied to stacked and managed filters.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
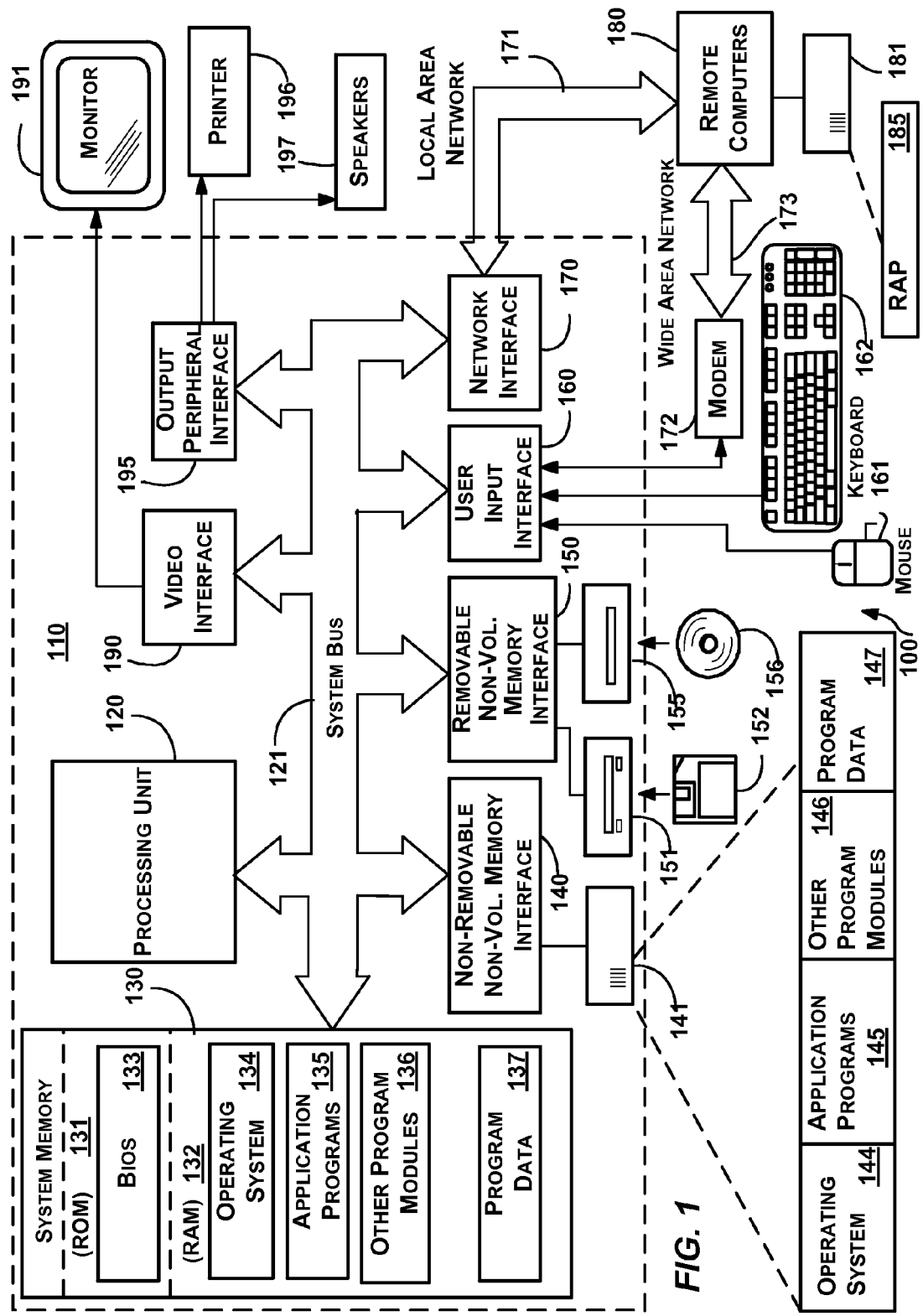
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like. A device capable of executing instructions (such as one of the above devices) is sometimes referred to as a machine.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Filters and Arrangements Thereof

Figure 2:
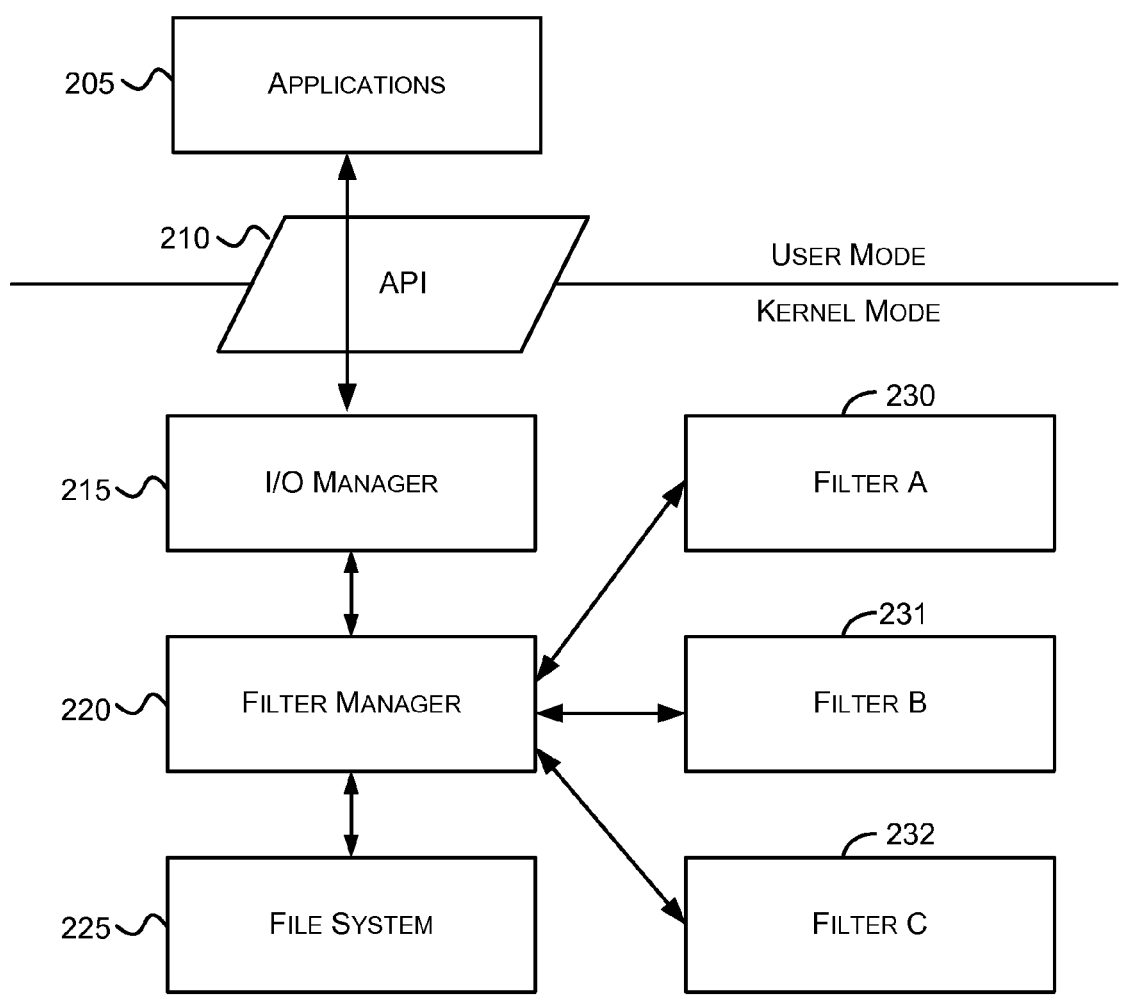
FIG. 2 is a block diagram representing an exemplary arrangement of components of a system in which aspects of the subject matter described herein may operate.

FIG. 2 is a block diagram representing an exemplary arrangement of components of a system in which aspects of the subject matter described herein may operate. The components include one or more applications 205, an applications programming interface (API) 210, an input/output (I/O) manager 215, a filter manger 220, a file system 225, and one or more filters 230-232.

The applications 205 may make file system requests (e.g., via function/method calls) through the API 210 to the I/O manager 215. The I/O manager 215 may determine what I/O request or requests should be issued to fulfill each request and send each I/O request to the filter manager 220. The I/O manager 210 may also return data to the applications 205 as operations associated with the file system requests proceed, complete, or abort.

In one implementation, filters comprise objects or the like that when instantiated register (e.g., during their initialization procedure) with a registration mechanism in the filter manager 220. Such filters are sometimes referred to as managed filters. For efficiency, each filter typically will only register for file system requests in which it may be interested in processing. To this end, as part of registration, each filter notifies the filter manager 220 of the types of I/O requests in which it is interested (e.g., create, read, write, cleanup, close, rename, set information, query information, and so forth). For example, an encryption filter may register for read and write I/Os, but not for others wherein data does not need to be encrypted or decrypted. Similarly, a quota filter may be interested only in object creates and object writes.

In addition to specifying the types of I/O requests in which it is interested, a filter may further specify whether the filter should be notified for pre-callbacks and post callbacks for each of the types of I/O. A pre-callback is called as data associated with an I/O request propagates from the I/O manager 215 towards the file system 225, while a post-callback is called during the completion of the I/O request as data associated with the I/O request propagates from the file system 225 towards the I/O manager 215.

From each I/O request, the filter manager 220 may create a data structure in a uniform format suitable for use by the filters 230-232. Hereinafter, this data structure is sometimes referred to as callback data. The filter manager 220 may then call and pass the callback data (or a reference thereto) to each filter that has registered to receive callbacks for the type of I/O received by the filter manager 220. Any filters registered to receive callbacks for the type of I/Os received by the filter manager are sometimes referred to as registered filters.

Typically, the filter manager 220 passes callback data associated with a particular type of I/O request to each registered filter sequentially in an order in which the registered filters are ordered. For example, if the filters 230 and 232 are registered to receive callbacks for all read I/O requests and are ordered such that the filter 230 is before the filter 232 in processing such requests, then after receiving a read I/O, the filter manager 220 may first call and pass the callback data to the filter 230 and after the filter 230 has processed the callback data, the filter manager 220 may then call and pass the callback data (as modified, if at all) to the filter 232.

A filter may be attached to one or more volumes. That is, a filter may be registered to be called and receive callback data for I/Os related to only one or more than one volumes.

A filter may generate its own I/O request which may then be passed to other filters. For example, an anti-virus filter may wish to read a file before it is opened. A filter may stop an I/O request from propagating further and may instruct the filter manager to report a status code (e.g., success or failure) for the I/O request. A filter may store data in memory and persist this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 215).

Figure 3:
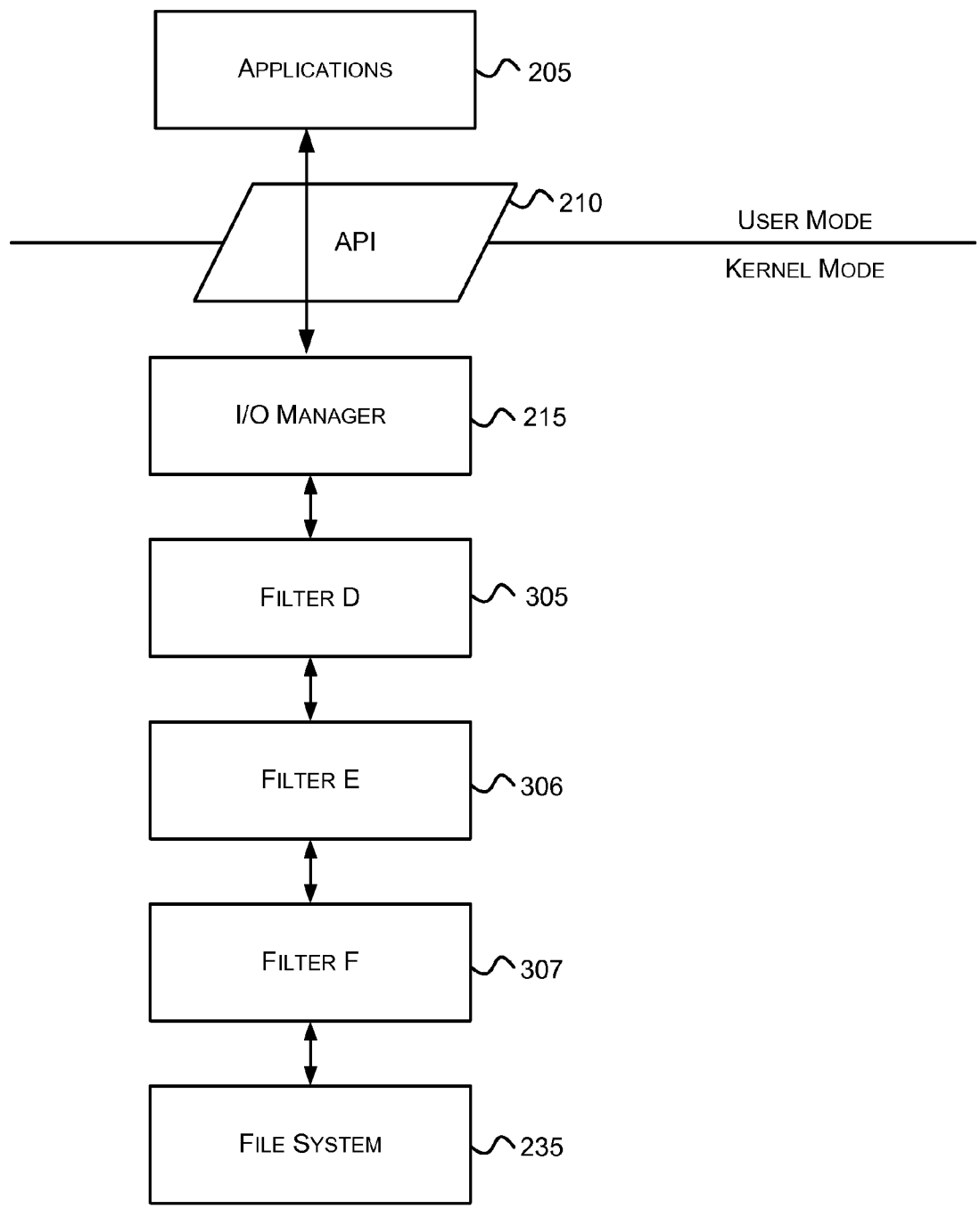
FIG. 3 is a block diagram representing another exemplary arrangement of components of a system in which aspects of the subject matter described herein may operate.

In one embodiment, filters may be arranged in a stacked manner as illustrated in FIG. 3, which is a block diagram representing another exemplary arrangement of components of a system in which aspects of the subject matter described herein may operate. In this embodiment, each of the filters 305-307 (sometimes referred to as stacked filters) may process I/O requests and pass the requests (modified or unmodified) to another filter or other component in the stack. For example, in response to a read request received from one of the applications 205, the I/O manager 215 may issue an I/O request and send this request to the filter 305. The filter 305 may examine the I/O request and determine that the filter 305 is not interested in the I/O request and then pass the I/O request unchanged to the filter 306. The filter 306 may determine that the filter 306 will perform some action based on the I/O request and may then pass the I/O request (changed or unchanged) to the filter 307. The filter 307 may determine that the filter 307 is not interested in the I/O request and pass the I/O request to the file system 235.

After the file system 235 services the I/O request, it passes the results to the filter 307. Typically, the results pass in an order reverse from that in which the I/O request proceeded (e.g., first to filter 307, then to filter 306, and then to filter 305). Each of the filters 305-307 may examine the results, determine whether the filter is interested in the results, and may perform actions based thereon before passing the results (changed or unchanged) on to another filter or component.

Figure 4:
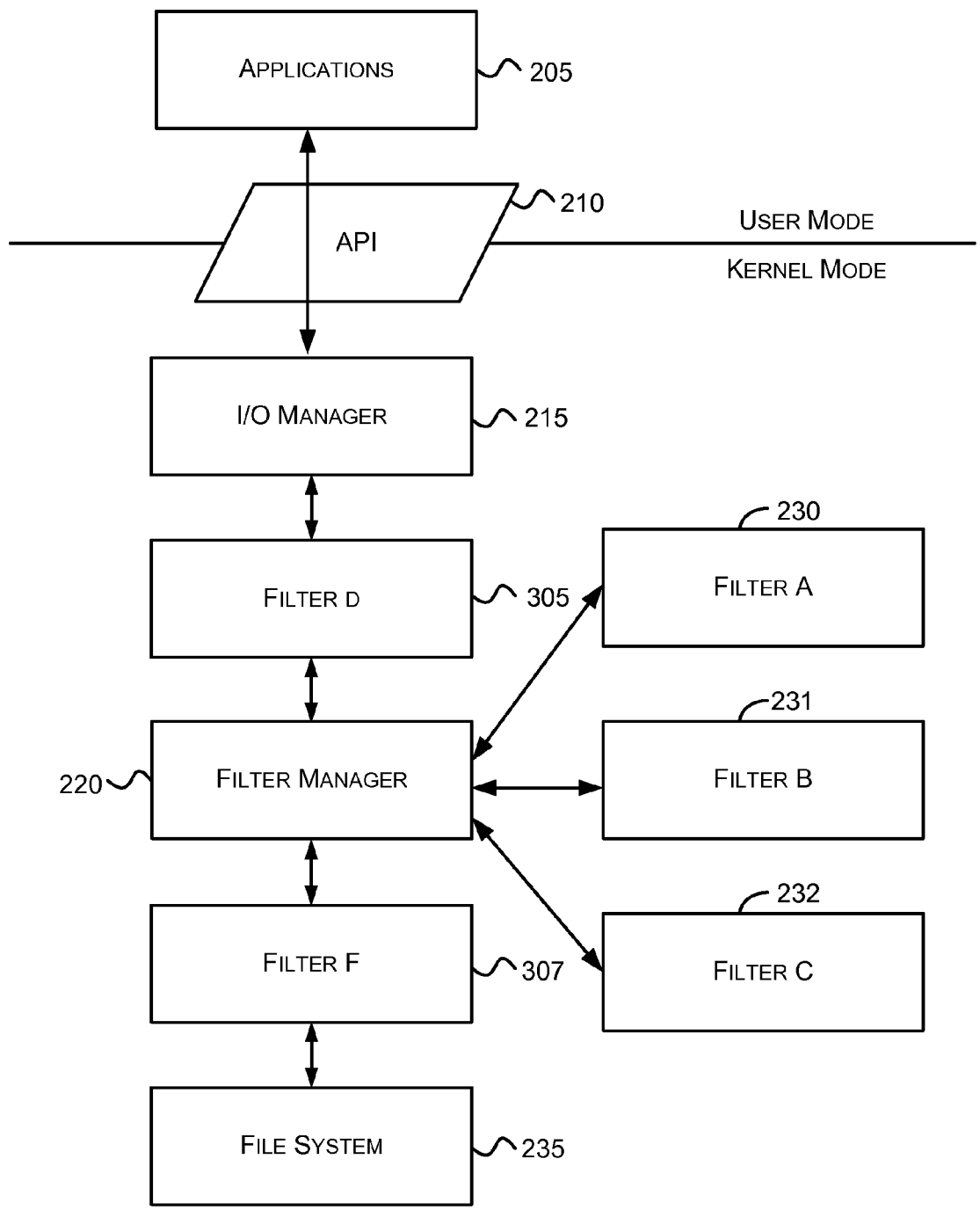
FIG. 4 is a block diagram representing another exemplary arrangement of components of a system in which aspects of the subject matter described herein may operate.

In another embodiment, filters may be arranged in a stacked/managed manner as illustrated in FIG. 4, which is a block diagram representing another exemplary arrangement of components of a system in which aspects of the subject matter described herein may operate. In this configuration, some filters are associated with a filter manager while other filters are not. The filter manager 220 is placed in a stack with other filters (e.g., filters 305 and 307).

It will be readily recognized that filters may be implemented in many other configurations without departing from the spirit or scope of the subject matter described herein. In some embodiments, a filter comprises any object that examines I/O between an application and a file system and that is capable of changing, completing, or aborting the I/O or performing other actions based thereon. Such filters may execute in user mode or in kernel mode and may be part of other components. In embodiments, other components described herein may execute in user mode or in kernel mode and may also be part of other components.

Returning to FIG. 2, the file system 235 may include one or more volumes that may be located locally or remotely to the machine or machines upon which the applications 205 execute.

Transaction Support

Figure 5:
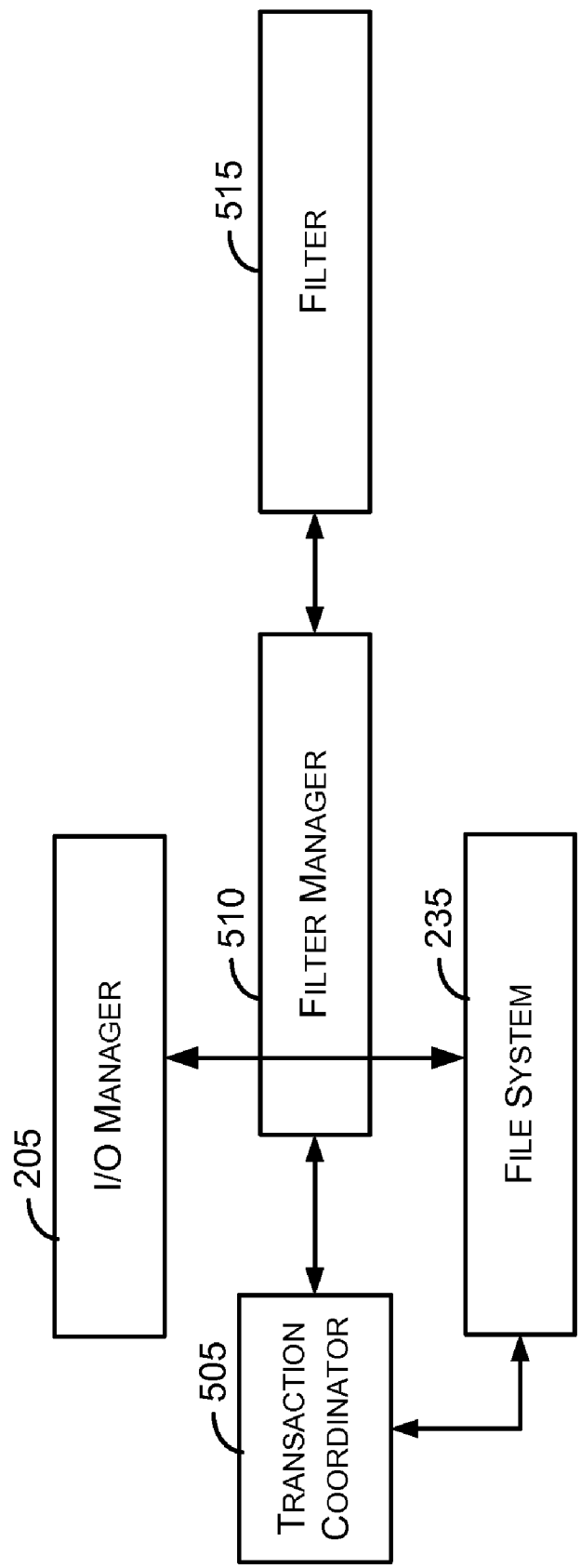
FIG. 5 is a block diagram that generally represents some of the components that may be used in implementing aspects of the subject matter described herein.

FIG. 5 is a block diagram that generally represents some of the components that may be used in implementing aspects of the subject matter described herein. The components include an I/O manager 205, a file system 235, a transaction coordinator 505, a filter manager 510, and a filter 515. The filter manager 510 and the filter 515 may include the functionality described in conjunction with FIGS. 2 and 4 together with functionality for dealing with transactions involving the file system 235. Although not shown, other filters may also be placed in the filter stack and/or managed by the filter manager 510 without departing from the spirit or scope of the subject matter described herein. Filters in the filter stack may also interact with the transaction coordinator 505 in dealing with transactions.

The transaction coordinator 505 may comprise a component that makes transactions available as objects and provides transaction management services to other components. In one embodiment, a transaction is a group of operations that have the following properties: atomic, consistent, isolated, and durable. In other embodiments, a transaction may comprise a group of operations with one or more of the above properties.

Atomic indicates that either every operation in the group succeeds, or the tangible effects of the operations in the group are undone (also known as rolled back). For example, a bank transfer may be implemented as an atomic set of two operations: a debit from one account and a credit to another account. If the two operations do not both succeed, then the transfer is either unfairly in favor of the bank or the account holder. Thus, either both should succeed in a transaction or the tangible effects (e.g., data stored to disk or memory) of any that did succeed should be undone.

Consistent means that if the data is consistent before the transaction begins, then it will be consistent after the transaction finishes. In the bank transfer example above, consistency may be defined as having the combined account balance of the two accounts be a constant. To implement consistency in the bank transfer example, the debit and credit operations simply need to be for the same amount of money.

Isolated means that the work done within a transaction that is in progress cannot be seen by threads performing work associated with other transactions or outside the transaction. For example, in an update, an electronic commerce site may need to have a new product category navigation page appear at the same time as the product detail pages that describe the new products. If the navigation page appeared before the product detail pages, this might cause missing pages for a customer who is currently shopping using the navigation page. Having the navigation page and the product detail pages appear at the same time may be implemented by updating and adding multiple directory entries under the control of a transaction.

Durability means that after an update is finished, its effects persist even if the system stops responding (e.g., because of a power outage). In the electronic commerce site example, durability can be provided by writing the updates to non-volatile storage such as a hard disk. Durability may also involve a system with data backup, recovery, and high availability mechanisms.

A component that uses the transaction coordinator 505 may decide the granularity with which it uses transactions. For example, a process may use a transaction to coordinate the work of updating one or more files. The process may update files not involved in a transaction. For example, an application may be designed so that it controls when it accesses a file with a transaction and when it does not.

A filter may need to know whether a file is participating in a transaction. For example, a filter that is used to enforce a quota on a user's disk usage may do so incorrectly if the filter is unaware that operations on the file are made as part of a transaction that subsequently gets rolled back. Similarly, a filter used in virus protection may fail to identify a virus in a file if the filter is unaware that a file is participating in a transaction.

Using the transaction coordinator 505 and the I/O manager 205, the filter manager 510 may provide functionality related to transactions to any filters the filter manager 510 manages (e.g., the filter 515). For example, the filter manager 510 may indicate whether or not a file operation (e.g., open, create, write, close, and the like) is related to a file that is within a transaction.

In one implementation, a file may be bound to a transaction upon an open operation of the file. An object associated with I/O related to a file may include a transaction ID that indicates that the file is or is not involved in a transaction as described below.

Figure 6:
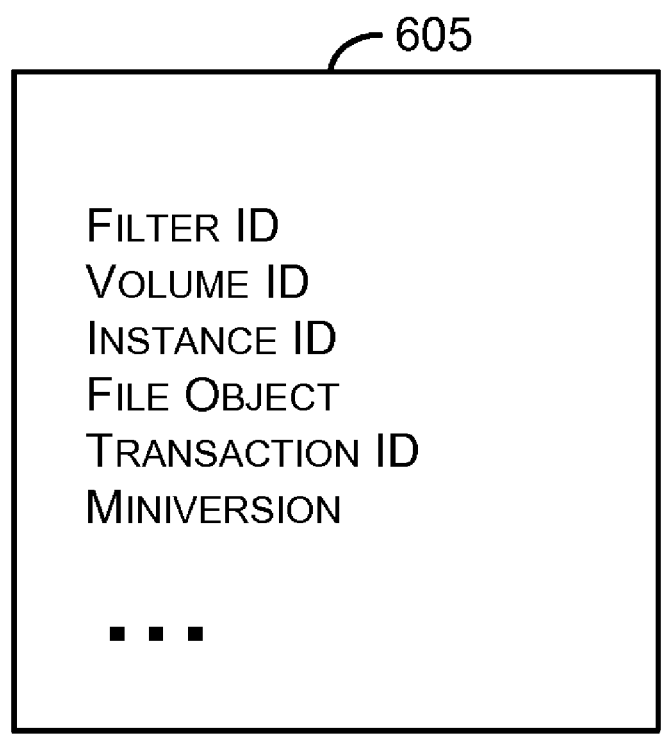
FIG. 6 is a diagram of some exemplary fields of a Related_Objects object, a pointer to which may be passed between a filter manager and a filter in accordance with aspects of the subject matter described herein.

When a file operation is received at the filter manager 510, the filter manager 510 may pass a pointer to an object (e.g., named Related_Objects) to the filter 515. An exemplary object is shown in FIG. 6, which is a diagram of some exemplary fields of a Related_Objects object, a pointer to which may be passed between a filter manager and a filter in accordance with aspects of the subject matter described herein. The Related_Objects object 605 may indicate other objects that are related to the file operation including whether the file operation relates to a file that is involved in a transaction.

As exemplary fields, the Related_Objects object 605 may include a filter ID, a volume ID, an instance ID, a file object ID, a transaction ID, a miniversion, and other fields that indicate objects related to a file operation. The filter ID may identify a filter while the instance ID may identify an instance of the filter. The volume ID may identify the volume associated with the file operation. The file object may reference or include data regarding the file operation.

The transaction ID may be assigned NULL if the file operation involves a file that is not in a transaction. If the transaction ID is not NULL, this may indicate that the file operation involves a file that is in a transaction. Furthermore, when not NULL, the transaction ID may be used to set or find a transaction context object which may include filter specific information associated with the transaction.

A transaction context object may be associated with a transaction ID through APIs (sometimes referred to simply as interfaces) provided by the filter manager 510 that allows the object to be read from, written to, allocated, and deleted. The filter 515 may store any type of data desired in the transaction context object. In one implementation, memory for the transaction context object associated with the filter 515 may be allocated when the filter 515 registers with the filter manager 510. Afterwards, upon demand, the filter 515 may request that memory reserved for transaction context objects be associated with a particular transaction ID. In another implementation, memory for the transaction context object may be allocated at any time. After the transaction commits or rolls back, the filter manager 510 may automatically reclaim all memory for transaction context objects associated with the transaction. In doing so, the filter manager 510 may also call a specified callback of the filter 515 so that the filter 515 may also perform various actions before the memory is reclaimed.

It should be recognized that a filter may be attached more than one time to the filter manager. Thus, in referencing memory associated with a transaction context object, a filter may need to pass a transaction ID and an instance ID.

A miniversion may be used within a transaction to allow reading a previous state of files involved in the transaction (without rolling back the transaction). There may be many miniversions associated with a transaction that allow reading of various states of files at different times throughout the transaction. In addition, a transaction may involve one or more save points. A save point allows the files involved in a transaction to be rolled back to the state that existed when the save point was created (without rolling back an entire transaction). This may be useful, for example, if a routine called during a transaction makes changes to files involved in the transaction but fails. By restoring to a save point created just before the routine was called, any changes made by the routine may be reversed. A miniversion may be used in concert with a save point to read the state of the files as they existed as a particular point in time (without rolling back the transaction).

Turning to FIG. 5, the filter manager may extract the information it uses to build the Related_Objects object 605 (of FIG. 6) from a file object that the I/O manager indicates is associated with a file operation.

When the filter 515 receives the Related_Objects object 605, the filter 515 may decide whether or not the filter 515 is interested in the transaction. If the filter 515 is interested in the transaction, the filter 515 may enlist to receive information regarding subsequent transaction events involving the file. In one embodiment, the filter 515 may enlist to receive information regarding transaction events when it receives an open I/O related to a file. In another embodiment, the filter 515 may enlist to receive information regarding transaction events any time during the transaction.

When registering with the filter manager 510 (e.g., during instantiation), the filter 515 may provide a transaction callback (e.g., method to call) that is to be called whenever a transaction event of interest occurs.

In enlisting to receive information regarding a transaction, the filter may request a callback (e.g., that the transaction callback method be called) whenever a transaction event in which the filter is interested occur. Some exemplary transaction events include commit, rollback, prepare to commit, pre-prepare to commit, save point create, save point rollback, and so forth. Upon enlistment, the filter manager 510 may create an enlistment structure that associates transactions with filters. This structure may then be used to provide callbacks to the appropriate filters.

When the filter manager 510 receives an I/O related to a transaction in which the filter 515 has enlisted, the filter manager 510 may callback the transaction callback of the filter 515 and pass a pointer to the Related_Objects object 605. The filter manager 510 may also pass a parameter (e.g., a bit mask) that indicates which type of transaction event has occurred. After receiving a callback that a transaction event has occurred, the filter 515 may perform any actions it desires as appropriate (including rolling back the transaction). After it finishes performing the actions, the filter 515 may then indicate completion (e.g., success or failure) to the filter manager 510. In response, the filter manager 510 may indicate to the transaction coordinator 505 that the transaction may complete successfully or rollback.

In one implementation, the transaction callback may be called asynchronously. In other words, the calling thread may call the transaction callback and may then proceed to perform other actions without waiting for a response from the transaction callback thread. After the transaction callback thread has completed, it may asynchronously inform the filter manager 510 of the completion.

APIs may be provided for various aspects of the subject matter described herein. For example, an API may be provided to register transaction callbacks with a filter manager. An API may be provided to enlist with the filter manager. An API may be provided that allows the filter 515 to read, write, or delete a transaction context object. An API may also be provided that allows a filter to force a rollback of a transaction. In response to a call to rollback a transaction, a filter manager may call a transaction coordinator and may request that the transaction coordinator rollback a specified transaction.

Figure 7:
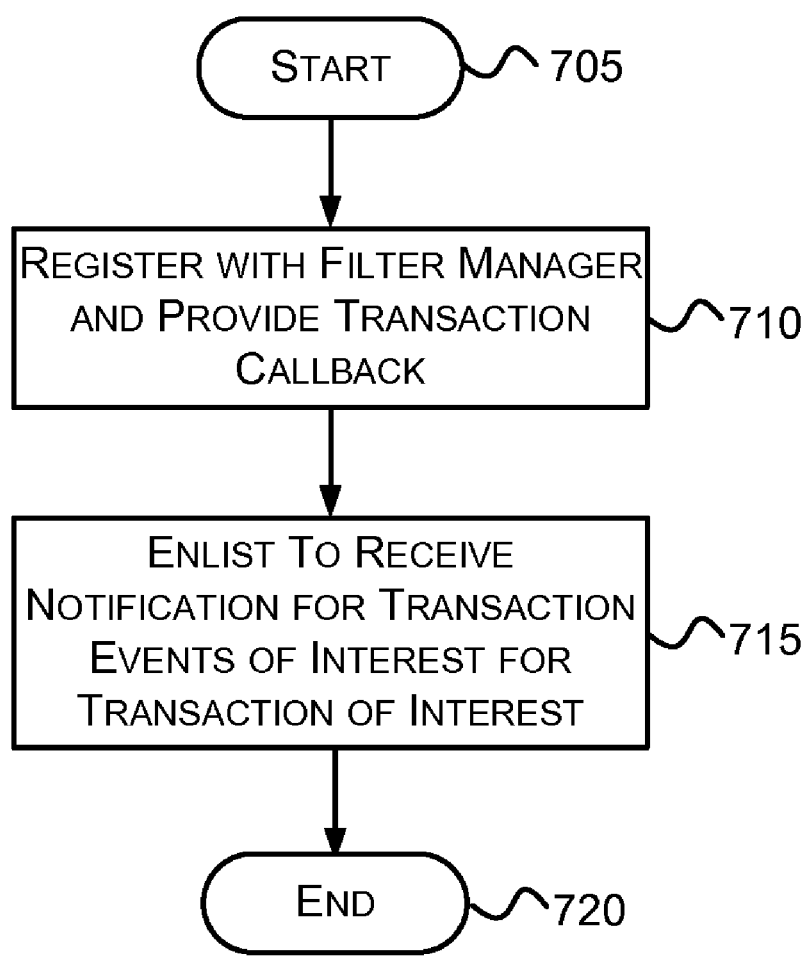
FIG. 7 is a flow diagram that generally represents actions that may occur in registering with a filter manager and enlisting to receive notification for transaction events of interest in accordance with aspects of the subject matter described herein.

FIG. 7 is a flow diagram that generally represents actions that may occur in registering with a filter manager and enlisting to receive notification for transaction events of interest in accordance with aspects of the subject matter described herein. At block 705, the actions start.

At block 705, a managed filter registers with a filter manager and provides a transaction callback. For example, referring to FIG. 5, upon instantiation, the filter 515 registers with the filter manager 510 and provides a callback at which notification of transaction events may be provided.

At block 715, the managed filter registers with the filter manager to receive notification for transaction events of interest for a transaction of interest. For example, referring to FIG. 5, upon receiving an I/O operation, the filter 515 may determine that it is interested in notification of transactions events associated with the file associated with the operation. After so deciding, the managed filter may enlist with the filter manager to receive notification for subsequent transaction events associated with the transaction.

The managed filter may enlist for each transaction in which it is interested. After enlisting, the managed filter may perform various actions while waiting for notification of a transaction event. At block 720, the actions end.

Figure 8:
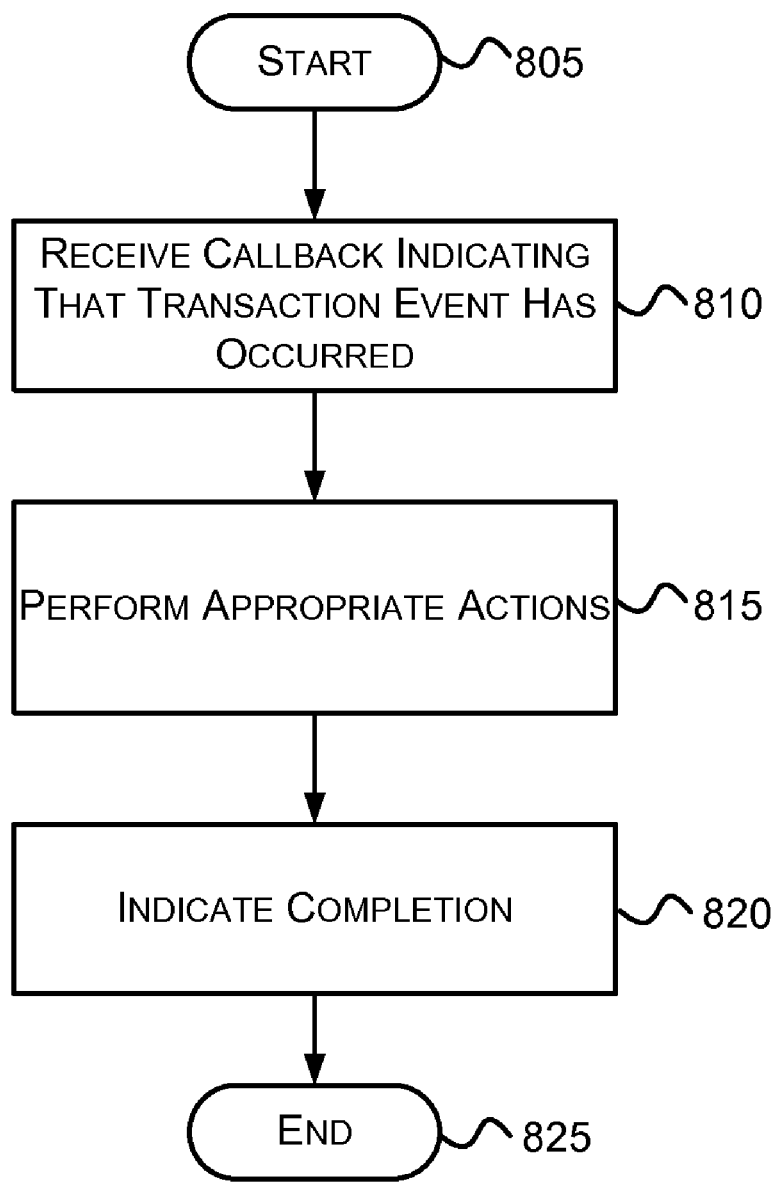
FIG. 8 is a flow diagram that generally represents actions that may occur when a transaction of interest occurs in accordance with aspects of the subject matter described herein.

FIG. 8 is a flow diagram that generally represents actions that may occur when a transaction of interest occurs in accordance with aspects of the subject matter described herein. At block 805, the actions start.

At block 810, the managed filter receives a callback indicating that a transaction event has occurred. The callback may pass a pointer as described earlier that identifies the transaction and other information. For example, referring to FIG. 5, the filter 515 may receive a callback from the filter manager 510 that indicates that a transaction event has occurred for a transaction in which the filter 515 has enlisted.

At block 815, the managed filter performs appropriate actions, if any, in response to the callback. For example, the managed filter may update data structures related to a quota when a transaction commits.

At block 820, the managed filter indicates completion so that the filter manager may indicate completion to the transaction coordinator.

At block 825, the actions end.

Figure 9:
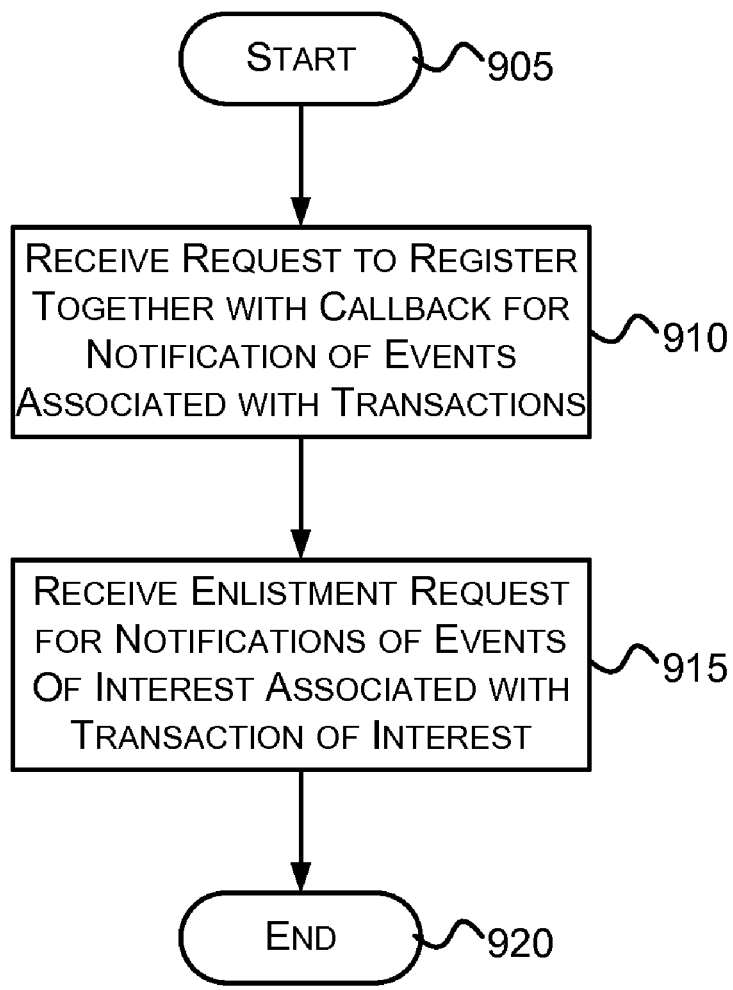
FIG. 9 is a flow diagram that generally represents actions that may occur in registering with a filter manager and enlisting to receive notification for transaction events of interest in accordance with aspects of the subject matter described herein.

FIG. 9 is a flow diagram that generally represents actions that may occur in registering with a filter manager and enlisting to receive notification for transaction events of interest in accordance with aspects of the subject matter described herein. At block 905, the actions start.

At block 910, the filter manager receives a request to register a managed filter with the filter manager together with a callback for notification of events associated with transactions. For example, referring to FIG. 5, the filter manager 510 may receive a request from the filter 515 together with a callback for notification of events associated with transactions. In response to the request, the filter manager 510 may update a data structure so that when the filter manager 510 receives notification from the transaction coordinator 505 regarding the transaction that the filter manager 510 may provide notification to the filter 515.

At block 915, the filter manager receives an enlistment request for notification of events of interest associated with a transaction of interest. For example, referring to FIG. 5, the filter manager 510 may receive an enlistment request from the filter 515 that indicates a transaction of which the filter 515 wishes to receive notification events.

Figure 10:
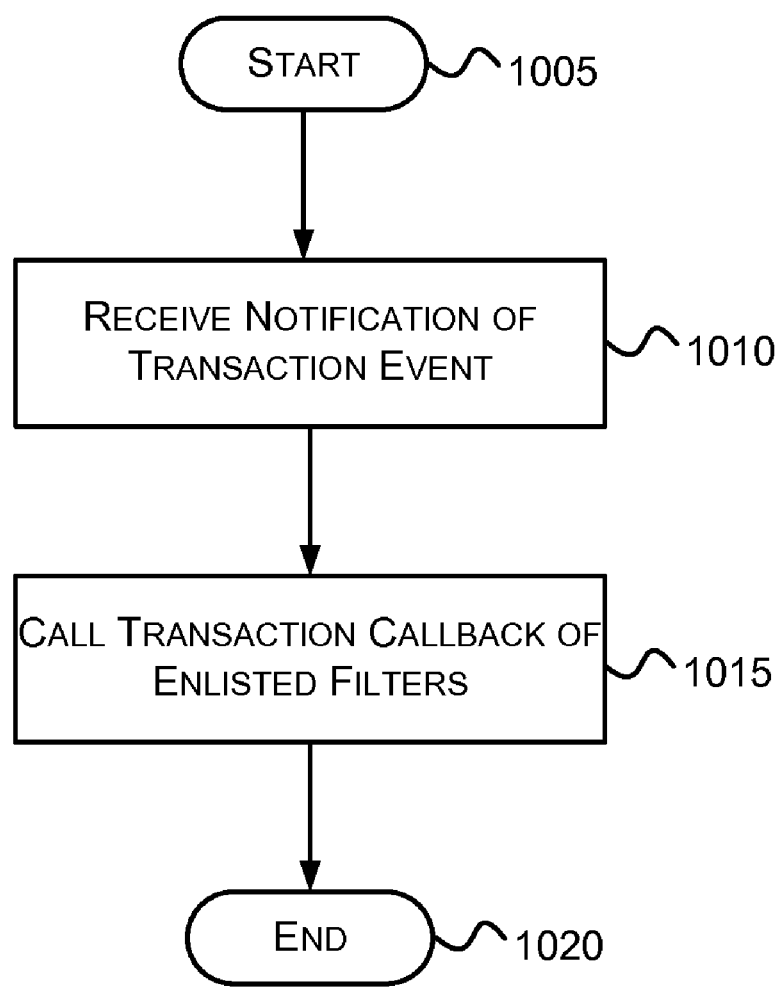
FIG. 10 is a flow diagram that generally represents actions that may occur when a transaction of interest occurs in accordance with aspects of the subject matter described herein.

Each time the filter manager receives a notification from the transaction coordinator regarding a transaction for which a managed filter has enlisted, the filter manager may provide notification to the enlisted managed filter as described in more detail in conjunction with FIG. 10. At block 920, the actions end.

FIG. 10 is a flow diagram that generally represents actions that may occur when a transaction of interest occurs in accordance with aspects of the subject matter described herein. At block 1005, the actions start.

At block 1010, the filter manager receives a notification indicating that a transaction event has occurred. For example, referring to FIG. 505, the filter manager 510 may receive notification from the transaction coordinator 505 that a transaction has occurred.

At block 1015, the filter manager may call the transaction callbacks of any managed filters that have enlisted to receive notification of events associated with the transaction to provide notification that a transaction event of interest has occurred. In doing so, the filter manager may pass a pointer as described earlier that identifies the transaction and other information. For example, referring to FIG. 5, the filter manager 510 may call a callback of filter 515 that indicates that a transaction event has occurred for a transaction in which the filter 515 has enlisted.

Figure 11:
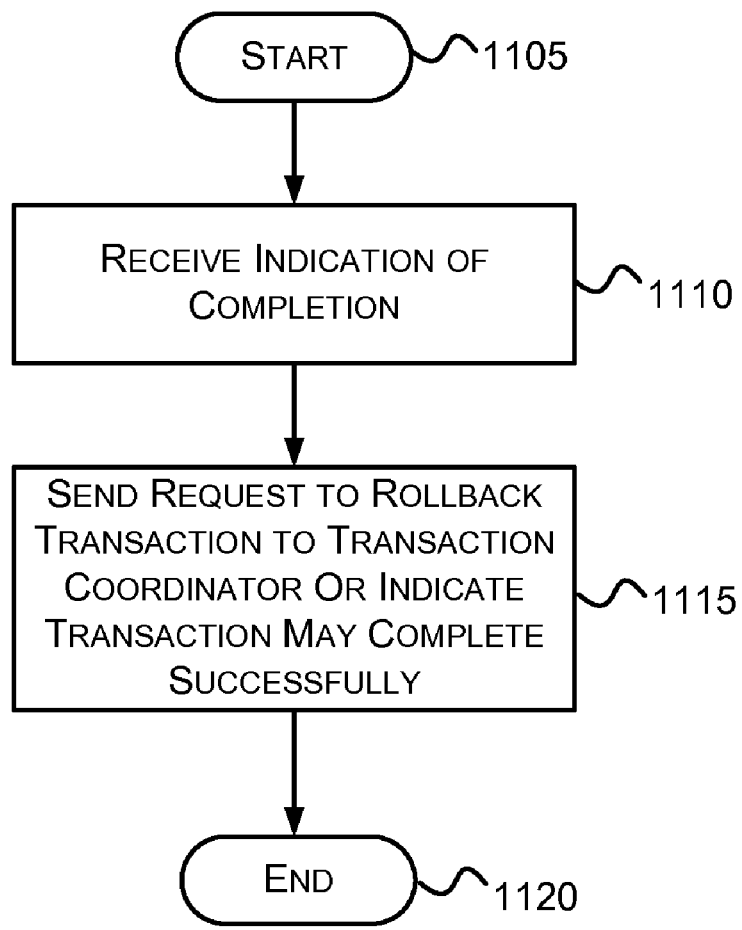
FIG. 11 is a flow diagram that generally represents actions that may occur after a managed filter has completed whatever actions it deems appropriate in response to notification of a transaction event in accordance with aspects of the subject matter described herein.

At some point, the filter manager may receive a completion notification from the managed filter as described in more detail in conjunction with FIG. 11. At block 1020, the actions end.

FIG. 11 is a flow diagram that generally represents actions that may occur after a managed filter has completed whatever actions it deems appropriate in response to notification of a transaction event in accordance with aspects of the subject matter described herein. At block 1105, the actions start.

At block 1110, the filter manager receives notification of completion from the managed filter. At block 1115, the filter manager sends a request to rollback the transaction to the transaction coordinator or indicates that the transaction may complete successfully. At block 1120, the actions end.

Aspects of the subject matter described herein are also applicable to stacked filters that are not registered with a filter manager. In one implementation, a filter may comprise a (volatile or durable) resource manager that registers with a transaction coordinator. A volatile resource manager does not need to persist data across reboots to support a transaction. In contrast, a durable resource manager needs to persist data across reboots such that the manager can restore the state of a transaction if, for example, power is interrupted during the middle of the transaction.

A stacked filter (hereinafter "filter") may perform various actions in order to deal with transactions. In one implementation, a filter may first create a transaction manager. In one embodiment a transaction manager is a kernel object that may be associated with a log. When creating the transaction manager, the filter may specify that the transaction manager is durable or volatile. After creating a transaction manager, the stacked filter (acting as a resource manager) may register with the transaction coordinator by calling a function (e.g., CreateResourceManager) to create a representation of itself to the transaction coordinator. In addition, the filter may pass a callback pointer to the transaction coordinator for the transaction coordinator to call when transaction events for which the filter has enlisted occur. As a resource manager, the filter participates in a transaction and may serve as an end-point for receiving notification of transaction events and single- and two-phase commit messages.

After registering with the transaction coordinator, the filter may watch for transacted file objects I/Os that it receives. The filter may call the I/O manager to determine which file objects are involved in transactions and to determine in which transaction each file objects is involved. In one implementation, the filter may watch for a particular type of I/O (e.g., open, write, and so forth). For file objects in which the filter is interested, the stacked filter may enlist in the appropriate transaction(s) to receive notification of certain transaction events (of interest) related to the transaction(s). The transaction events of interest may be specified by the filter when enlisting or at another time.

As a transaction proceeds, the filter may then be called back when events for which is has enlisted occur. In its duties as a resource manager, when commit is called for the transaction, the filter may receive a prepare notification. In response, the filter may flush any data associated with the transaction to a log file and indicate that the filter has completed preparation (e.g., by calling PrepareComplete).

Depending on the outcome of the transaction, the filter may receive a commit or rollback notification event. If the filter receives a commit notification, it makes any changes it has made permanent and informs the transaction coordinator by calling a function (e.g., CommitComplete). If the filter receives a rollback notification, the filter discards the changes made within the context of the specified transaction and then signals the completion of this processing (e.g., RollbackComplete).

If the filter desires to store context regarding a transaction, the filter may allocate, update, and deallocate memory as appropriate. In addition, the filter may associate transaction context objects with particular transactions.

In one implementation, a filter manager implements the functionality regarding interfacing with a transaction coordinator that a stacked filter implements and provides additional functionality to managed filters as described previously. In one embodiment, the filter manager enlists in all transaction events for each transaction and then notifies managed filters of transaction events for which they have enlisted as appropriate. In another embodiment, the filter manager enlists with the transaction coordinator once for each enlistment the filter manager receives from a managed filter. When the filter manager receives notification of a transaction event, the filter manager provides notification as appropriate to a corresponding managed filter which enlisted with the filter manager to receive notification of the transaction event.

As can be seen from the foregoing detailed description, aspects have been described related to transactions and file system filters. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having stored computer-executable instructions which when executed by a processor of a computer perform a method for notifying file system filters of transaction events, the method comprising:
   a filter, which is loaded into memory of the computer, registering with a filter manager to receive file system operations of a file system that supports transactions, the file system operations including open, create, write, and close operations;
   the filter manager receiving a first file system operation comprising an open operation that opens a file as part of a transaction;
   the filter manager passing an object related to the first file system operation to the filter, the object specifying that the first file system operation comprises an open operation that has opened the file as part of a transaction, wherein the transaction comprises a plurality of operations having the properties of being atomic, consistent, isolated, and durable;
   the filter enlisting with the filter manager to receive notification of subsequent transaction events involving the file by calling an interface of the filter manager and providing information that indicates transaction events involving the file for which the filter is to be notified, wherein the subsequent transaction events comprise commit, rollback, prepare to commit, pre-prepare to commit, save point create, and save point rollback;
   upon receiving a subsequent transaction event comprising a rollback event that involves the file that is involved in the transaction, the filter manager notifying the filter of the subsequent transaction event; and
   in response to receiving notification of the subsequent transaction event, the filter performing an action.

2. The computer-readable storage medium of claim 1, wherein the filter comprises a stacked filter.

3. The computer-readable storage medium of claim 1, wherein performing the action comprises sending notification to the filter manager that indicates that the filter has completed zero or more actions in response to receiving the notification of the transaction event.

4. The computer-readable storage medium of claim 1, wherein registering with the filter manager comprises providing a transaction callback to the filter manager that the filter manager calls when a file system operation occurs for which the filter has registered.

5. The computer-readable storage medium of claim 4, wherein notifying the filter of the second file system operation comprises providing the notification via the transaction callback.

6. The computer-readable storage medium of claim 1, wherein the object related to the first file system operation identifies a transaction ID and wherein the filter uses the transaction ID to access a transaction context object associated with the transaction ID via an interface provided by the filter manager.

7. The computer-readable storage medium of claim 1, wherein the property of being atomic comprises a property of having every operation involved in the transaction succeed or having any tangible effects of any operation that did not succeed undone.

8. A method performed by a processor of a computer for notifying file system filters of transaction events, the method comprising:
   a filter, which is loaded into memory of the computer, registering with a filter manager to receive file system operations of a file system that supports transactions, the file system operations including open, create, write, and close operations;
   the filter manager receiving a first file system operation comprising an open operation that opens a file as part of a transaction;
   the filter manager passing an object related to the first file system operation to the filter, the object specifying that the first file system operation comprises an open operation that has opened the file as part of a transaction, wherein the transaction comprises a plurality of operations having the properties of being atomic, consistent, isolated, and durable;
   the filter enlisting with the filter manager to receive notification of subsequent transaction events involving the file by calling an interface of the filter manager and providing information that indicates transaction events involving the file for which the filter is to be notified, wherein the transaction events comprise commit, rollback, prepare to commit, pre-prepare to commit, save point create, and save point rollback;
   upon receiving a subsequent transaction event comprising a rollback event that undoes each of the plurality of operations of the transaction in which the file is involved, the filter manager notifying the filter of the subsequent transaction event by passing the object and an indication that the rollback event has been received by the filter manager; and
   instructing the filter manager to allow the transaction to be rolled back,
   wherein the method is performed by the processor of the computer.

9. The method of claim 8, wherein registering with the filter manager comprises providing the filter manager with a callback which the filter manager calls when a file system operation occurs for which the filter has registered.

10. The method of claim 8, further comprising the filter manager receiving, from the filter, the instruction to allow the transaction to be rolled back, and in response, sending a request to a transaction coordinator to rollback the transaction as indicated by the filter.

11. The method of claim 8, wherein the notification of the transaction event comprises a pointer to a transaction context object that includes filter specific information associated with the transaction.

12. The method of claim 11, wherein the transaction context object includes a filter ID, a volume ID, an instance ID, a file object ID, a transaction ID, and a miniversion.

13. A method performed by a computer having a processor and memory for notifying a file system filter that a file is involved in a transaction, the method comprising:
   receiving, by a filter manager that is loaded into memory of the computer, a request, from a filter that is also loaded into memory, to register the filter to receive notifications of file system operations that involve a file of the computer's file system;

registering the filter with the filter manager;

receiving, by the filter manager, a first file system operation that opens the file, wherein the first file system operation opens the file as part of a transaction such that any subsequent file system operations performed within the transaction will be grouped together having the properties of being atomic, consistent, isolated and durable;

sending, by the filter manager, a notification to the filter that indicates that the file has been opened as part of the transaction;

receiving, by the filter manager, a request, from the filter, to enlist the filter to receive notification of specified events of the transaction, wherein the specified events comprise one or more of commit, rollback, prepare to commit, pre-prepare to commit, save point create, and save point rollback;

receiving, by the filter manager, a second file system operation that writes to the file, a third file system operation that opens a different file, and a fourth file system operation that writes to the different file, wherein the first, second, third, and fourth file system operations are all part of the transaction;

receiving, by the filter manager, a file system event comprising a commit event to commit each of the first, second, third, and fourth file system operations of the transaction;

sending, to the filter, a notification of the commit event;

receiving, by the filter manager, an instruction from the filter that the filter has approved the transaction to commit; and allowing the transaction to commit such that the changes made by the second and fourth file system operations to the file and different file respectively are persisted such that other processes outside of the transaction may view the changes.

* * * * *